United States Patent

[11] 3,562,620

| [72] | Inventor | Arthur K. Haslehurst<br>Northworthy, 11 Louvain Road, Derby, England |
|---|---|---|
| [21] | Appl. No. | 711,802 |
| [22] | Filed | Mar. 8, 1968 |
| [45] | Patented | Feb. 9, 1971 |
| [32] | Priority | Mar. 11, 1967 |
| [33] | | Great Britain |
| [31] | | 11,503/67 |

[54] CONTROL SYSTEM FOR OVERCOMING STICTION, FRICTION IN ELECTRIC MOTORS
12 Claims, 2 Drawing Figs.

[52] U.S. Cl............................................ 318/616, 318/681
[51] Int. Cl............................................ G05f 1/08
[50] Field of Search............................................ 318/18—33

[56] References Cited
UNITED STATES PATENTS

| 3,110,851 | 11/1963 | Plogstedt et al. ............. | 318/29X |
| 3,188,482 | 6/1965 | Woodworth et al. ......... | 318/28X |

Primary Examiner—B. Dobeck
Attorney—Imirie and Smiley

ABSTRACT: A positional control system comprises an electric motor, circuit means responsive to the position of the member to be controlled and operative to cause the motor to oscillate the member rapidly about the desired position, and damping means to limit the amplitude of the oscillation to an acceptable level.

Fig.1.

Inventor
ARTHUR K. HASLEHURST

Inventor
ARTHUR K. HASLEHURST

CONTROL SYSTEM FOR OVERCOMING STICTION, FRICTION IN ELECTRIC MOTORS

The invention relates to control systems and is particularly concerned with the reduction of inaccuracies which can arise, for example, where stiction or other cause sets up a dead zone extending on each side of a desired condition or where undesirable oscillations occur about the desired condition.

According to the invention there is provided a method of overcoming the effects of stiction, friction or the like in a control system having a member movable to and from a desired position or between predetermined position, comprising driving the member in a manner such that on approaching such a position it overshoots and then commences to oscillate about a mean at the position, and utilizing such oscillations to operate damping means effective to quench the oscillations, whereby the member is maintained continuously oscillating with limited amplitude about the desired position.

According to the invention there is also provided an electric motor control system for overcoming the effects of stiction, friction or the like in a member movable by the motor to and from a desired position or between predetermined positions, including detecting means responsive to the arrival of the member at such a position and operatively connected to switching means effective to reverse the direction of rotation of the motor to cause the member to oscillate about such position, and damping means operative in response to such oscillations to reduce the power supplied to the motor so as to reduce the amplitude of the oscillations whereby the member is maintained continuously oscillating with limited amplitude about the desired position.

A control system according to the invention, therefore, can be arranged to oscillate continuously and rapidly about a desired position, the continuous oscillations eliminating the dead zone which can arise due to stiction, friction or other cause in control systems in which the desired position is approached slowly, and the damping means acts to reduce the amplitude of the oscillations to a very low level.

A control system embodying the invention for controlling an electric motor will now be described by way of example and with reference to the accompanying drawings in which.

The control system to be described is for controlling the shaft of a motor to run to a particular angular position. A pair of contacts X, Y are arranged to be actuated by the motor shaft whereby the contacts are closed when the shaft is displaced in one direction from the desired position and are opened when the shaft is displaced in the other direction from the desired position. In a manner to described, the motor is caused to run, in the appropriate direction depending on whether contacts X and Y are closed or open, to drive the motor shaft and member towards the desired position.

Figure 1:
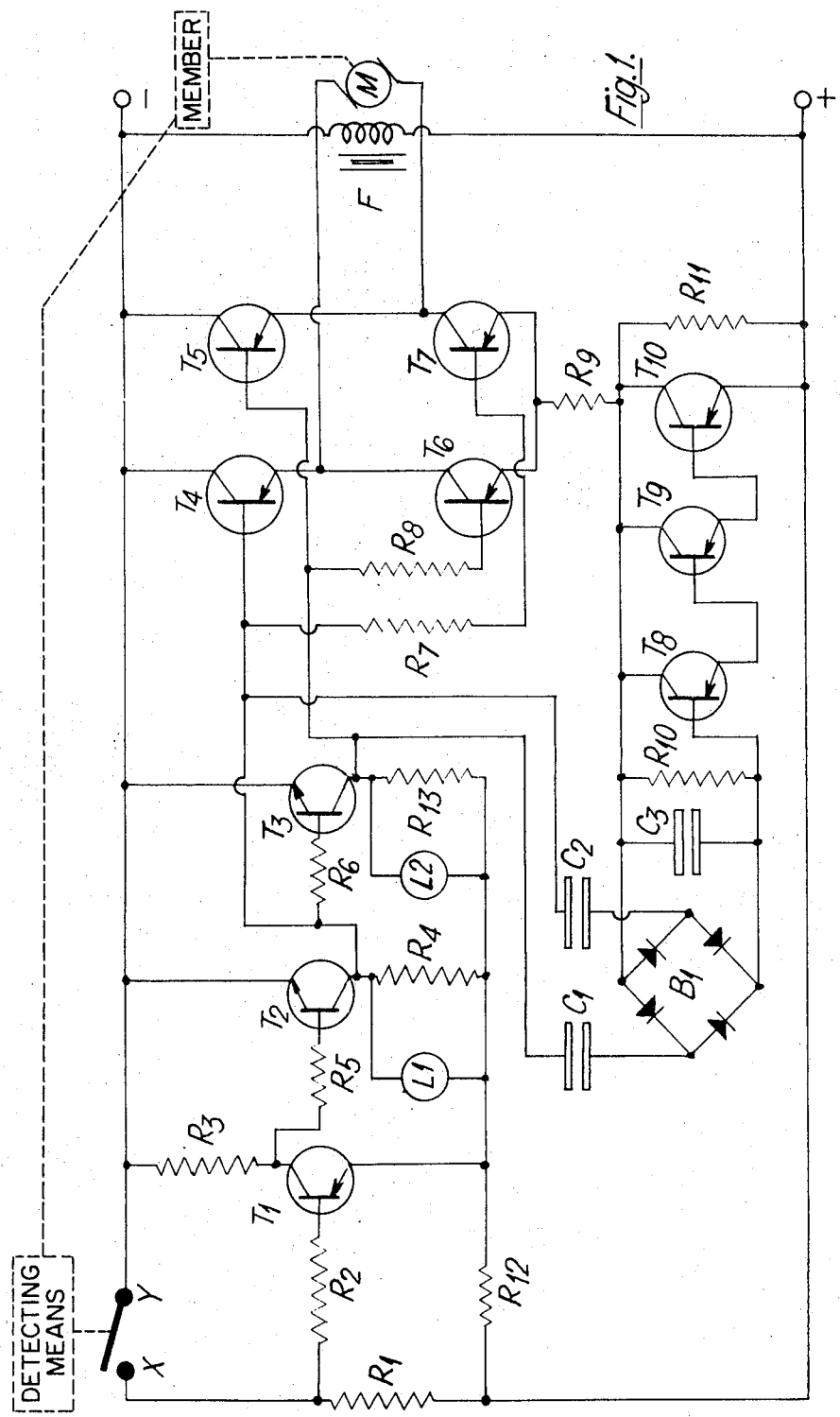
FIG. 1 is a circuit diagram of the control system.
Figure 2:
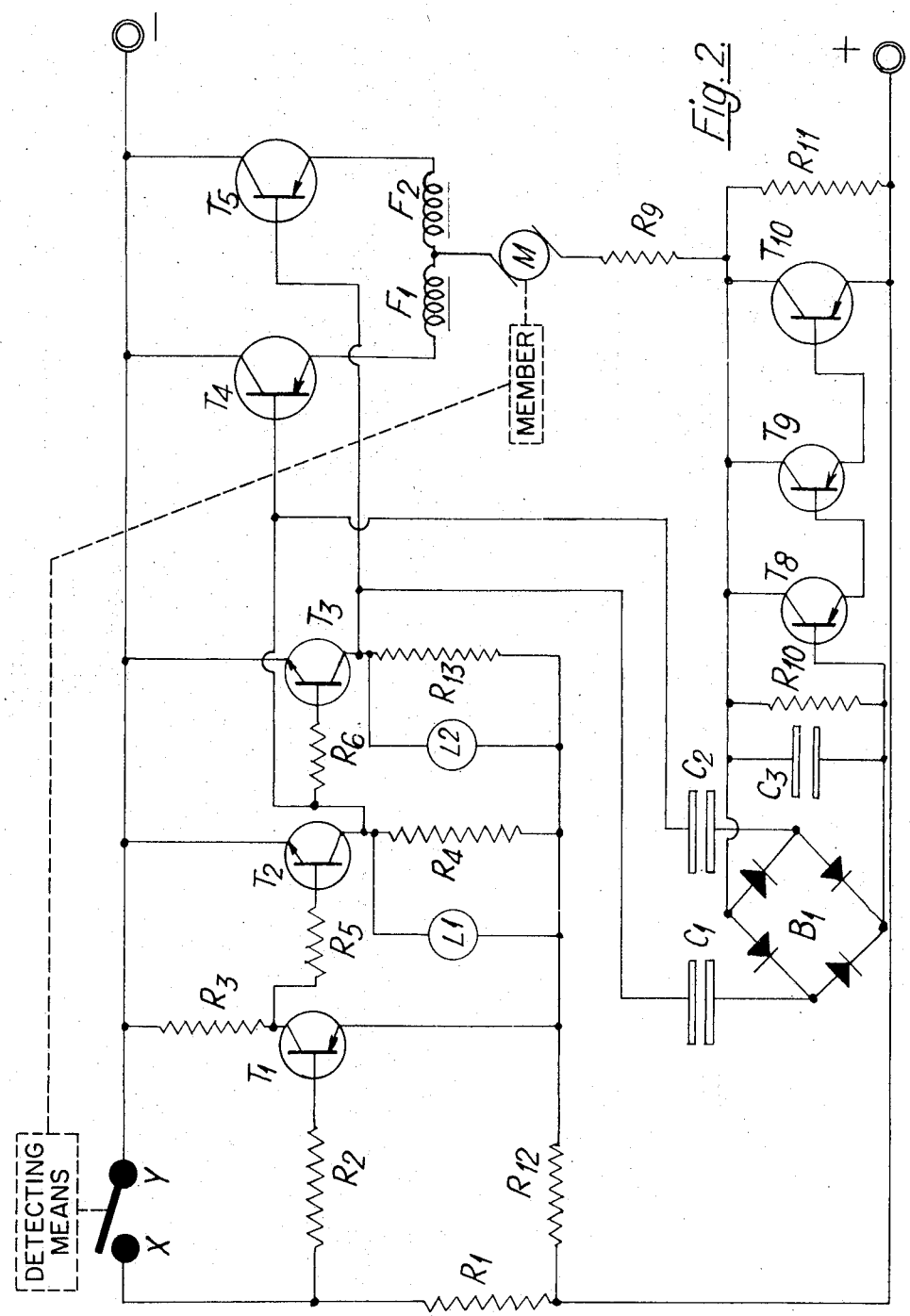
FIG. 2 is a circuit diagram of a modified version of the system of FIG. 1.

In FIG. 1 a shunt wound field F is shown, (a permanent magnet field could be used instead), whilst the FIG. 2 the connections are shown for a split field series wound motor, the field coils being indicated at F1, F2.

When the contacts X, Y close, a PNP transistor T1 is triggered via its base resistor R2, causing current to flow in a collector load resistor R3. This causes the base of an NPN transistor T2 to go positive through a resistor R5, and a transistor T2 commences to pass current through a resistor R4. This causes the base of a NPN T3 to become negative via a resistor R6 and the current in a resistor R13 ceases to flow. In this condition, the bases of power transistors T4 and T7 will be held at negative potential, the latter through a resistor R7, and these transistors will both conduct. Similarly in this same condition the bases of power transistors T5 and T6 will be held at positive potential, the latter through a resistor R8, and will not conduct. Conversely if contacts X, Y are open, the base of transistor T1 is held positive via a resistor R1 and the transistors reverse their condition, resulting in the firing of power transistors T5 and T6 thereby reversing the direction of current flow through the motor armature.

The motor thus rotates in the appropriate direction to drive the shaft towards the desired position. If, when the motor first approaches the position the transistor T10 is conductive, full power is applied to the motor so that it will overshoot the desired position, contacts X and Y will therefore open causing switching of the transistors and reversal of the motor which will overshoot the position in the opposite direction. Repeated opening and closing of contacts X and Y will then take place together with corresponding switching off and on of the other transistors in the circuit so that the member will oscillate about the desired position.

When such oscillations occur, capacitors C1 and C2 pass, to a rectifier bridge B1, the alternating current produced by the switching on and off of transistors T2 and T3. The rectified direct current from the bridge charges the capacitor C3 causing a PNP transistor T8 to be switched into a nonconducting state. This, through a PNP transistor T9, causes the power transistor T10 also to be switched nonconducting. It will be seen therefore that the motor current will depend in this state upon the size of the resistor R11 and will be relatively low, thus tending to damp the oscillations.

When the motor is commanded to a new desired position the oscillations cease, the alternating current supply to the bridge B1 ceases, and the voltage across capacitor C3 bleeds away through a resistor R10, putting transistors T8, T9 and T10 into a conducting state. This has the effect of short circuiting the resistor R11 and the motor is able to take its maximum current, thus rapidly driving the shaft towards the new desired position and setting up the oscillations again.

The series resistor R12 may be included to provide a small positive bias to the transistor T1, via its base holddown resistor R1. Indicator lamps L1, L2 may be provided if desired to demonstrate the operating condition of the circuit.

The operation of the circuit of FIG. 2 (in which parts corresponding to parts in FIG. 1 are similarly referenced) is similar to that described. However, the power transistors T6, T7 with their base resistors R7, R8 are not required due to the type of motor employed.

It will be seen that the circuits described cause a motor-driven member to be maintained continuously oscillating about a desired position, and therefore overcome the effects of stiction, friction or other nonlinear cause which might, in a system in which the desired position was approached slowly, cause a dead zone to be set up around the critical point: at the same time, however, the damping effect of the transistor T10 and its associated components maintains the amplitude of the oscillations at a low value.

In a case where a photoelectric cell is used to open and close contacts X, Y it will be realized that with the cell partially obscured from the light it will be possible to find a condition where the cell resistance is just sufficient to create a state of balance in the rest of the circuit.

In order to prevent such a situation arising and bringing the motor to rest, a capacitor may be connected between the trigger point X and the junction of resistors R4 and R6 (or between two other suitable points) to provide sufficient feed back to set up natural oscillations when this critical state of balance is reached. As before, the transistor T10 acts to damp the amplitude of the oscillations. This extra capacitor also serves the purpose, in the circuit of FIG. 1, of preventing a situation arising in which all four transistors T4 to T7 conduct equally and thus short circuit the motor.

I claim:

1. An electric motor control system for overcoming the effects of stiction, friction or the like in a member movable by the motor to and from a desired position or between predetermined positions, including detecting means responsive to the arrival of the member at such a position and operatively connected to switching means effective to reverse the direction of rotation of the motor to cause the member to oscillate about such position, and damping means operative in response to such oscillations to reduce the power supplied to the motor so as to reduce the amplitude of the oscillations whereby the member is maintained continuously oscillating with limited amplitude about the desired position.

2. An electric motor control system according to claim 1, in which said damping means comprises means operative in response to repeated operation of said switching means to increase electrical resistance in circuit with the motor.

3. An electric motor control system according to claim 2 in which said damping means includes electronic switch means connected to increase the resistance of the motor circuit when actuated, and means operative only in response to repeated operation of said switching means to actuate said electronic switch means.

4. An electric motor control system according to claim 3 in which the means operative to actuate said electronic switch means comprises means operative only in response to repeated operation of said switching means to derive an alternating current therefrom, and rectifying means connected to rectify the alternating current, the electronic switch means being actuated by the rectified current.

5. An electric motor control system for overcoming the effects of stiction, friction or the like in a member movable by the motor to and from a desired position or between predetermined positions, including detecting means responsive to the arrival of the member at such position and operatively connected to electronic switching means effective to reverse the direction of rotation of the motor to cause the member to oscillate about such position, capacitive means connected to pass such oscillations to rectifying means and electronic switch means connected for actuation by the rectified signals and operative to increase electrical resistance in circuit with the motor whereby to reduce the power supplied to the motor such that the member is maintained continuously oscillating with limited amplitude about the desired position.

6. A method of overcoming the effects of stiction, friction or the like in a control system having a member movable to and from a desired position or between predetermined positions, comprising driving the member in a manner such that on approaching such a position it overshots and then commences to oscillate about a mean at the position, and utilizing such oscillations to operate damping means effective to reduce the amplitude of the oscillations, whereby the member is maintained continuously oscillating with limited amplitude about the desired position.

7. A method according to claim 6 wherein said oscillations are used to energize electronic switch means effective to increase electrical resistance in circuit with the motor whereby to reduce the power supplied to the motor.

8. A method according to claim 7 wherein said oscillations are fed through capacitive means to rectifying means, said electronic switch means being actuated by the rectified current.

9. In a servomechanism having a movable member subject to frictional forces which may introduce positional error in desired positions thereof, drive means for moving said member, and a power source connected to and energizing said drive means, in combination:

control means responsive to positioning of said member on opposite sides of a desired position for reversing the connection between said power source and said drive means so as continuously to maintain said member in oscillatory motion about said desired position; and damping means responsive to the amplitude of said oscillatory motion about said desired position for reducing the power supplied to said drive means thereby to limit such amplitude to a predetermined value.

10. In a servomechanism as defined in claim 9 wherein said control means includes switch means having two states respectively for the positions of said member on opposite sides of said desired position, and a current reversing circuit controlled by the states of said switch means.

11. In a servomechanism as defined in claim 10 wherein said damping means includes a capacitor charged according to the time durations of said states of the switch means, and second switch means controlled by said capacitor for reducing the power supplied to said drive means when said capacitor charges to a predetermined value.

12. In a servomechanism as defined in claim 9 wherein said damping means includes capacitor means charged according to the amplitudes of said member on the opposite sides of said desired position, and switch means controlled by said capacitor means for reducing the power supplied to said drive means when said capacitor means is charged to a predetermined value.